United States Patent [19]

Otteman

[11] Patent Number: 4,988,078
[45] Date of Patent: Jan. 29, 1991

[54] HIGH FLOW RATE MINIATURE VALVE

[76] Inventor: John H. Otteman, 4005 Hecker Pass Hwy., Gilroy, Calif. 95020

[21] Appl. No.: 384,716

[22] Filed: Jul. 24, 1989

[51] Int. Cl.$^5$ ............................................. F16K 27/02
[52] U.S. Cl. .................................. 251/367; 251/366; 251/118; 29/890.127
[58] Field of Search ...................... 251/367, 366, 118; 29/157.1 R

[56] References Cited

U.S. PATENT DOCUMENTS 2,387,013 10/1945 Fuller .............................. 251/366 X

FOREIGN PATENT DOCUMENTS

| 122838 | 5/1931 | Austria | 251/367 |
| 1359824 | 3/1964 | France | 251/366 |
| 565586 | 11/1944 | United Kingdom | 251/367 |

Primary Examiner—Arnold Rosenthal
Attorney, Agent, or Firm—Donald D. Mon

[57] ABSTRACT

A valve, particularly for smaller sizes, with minimized envelope size and dead volume. Its body is comprised of two seamless parts, one inserted into the other and welded together with a single weld. This weld is the only joinder of the two parts. The inserted part has a valve seat and a free end which is cantilevered freely into the other part so the free end does not contact the other part. Closure means and actuator means are provided to control the valve.

4 Claims, 1 Drawing Sheet

HIGH FLOW RATE MINIATURE VALVE

FIELD OF THE INVENTION

This invention relates to miniature valves for controlling the flow of fluid.

BACKGROUND OF THE INVENTION

Production of valves with the use of conventional machining processes inherently reduces the flow capacity of a valve for a given valve envelope size, and also usually is wasteful of internal volume.

It is an object of this invention to provide a valve with a two-part body assembly which enables significant reduction in envelope size for a given flow rate. It is especially useful for miniature valves, intended to control flow of fluids through pipes of about ½ inches inside diameter or smaller It is a further advantage that these parts can be made with molding processes in which cores are pulled, or with conventional drilling and milling operations in metal such as stainless steel which produce shapes congruent to molded shapes, as the consequence of rotary actions rotating around what would be the pull axis of a core.

For valves in the chemical processing industries, internal volume is a nuisance. It is wasteful of materials and is proportionally difficult to flush out. Reduction of internal volume is a significant objective and is attained with the valve of this invention.

Adaptability to various mechanisms is another advantage sought for valves Which are put to various uses. This invention provides a very adaptable body, able to accept a wide range of valve elements and actuators.

BRIEF DESCRIPTION OF THE INVENTION

A valve according to this invention includes a valve body made of two joined parts. A first of these parts has a neck with an actuator passage to receive a valve actuator, an exit port, and an assembly port. The ports are aligned such that this part can be manufactured with simple core pulls or with machining processes which generate the same shape as the respective core.

The second body part is proportioned to fit in the assembly port. It includes an inlet port having a flow axis, and a valve seat lying in a plane normal to the flow axis. This part also is formed by a molding or cutting operation as described above.

The second body is assembled to and is sealed with the first body, with the valve seat facing up the actuator passage. A valve actuator is mounted to the neck and carries a closure to open and close the valve by moving away from or against the valve seat.

Actuator mounting means is provided on the neck, such as threads to which the actuator can be mounted, and the neck is sealed against leakage.

The above and other features of this invention will be fully understood from the following detailed description and the accompanying drawings, in which:

DETAILED DESCRIPTION OF THE INVENTION

Figure 1:
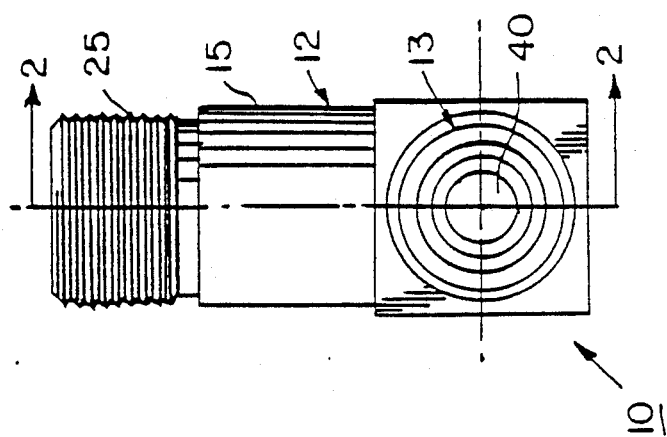
FIG. 1 is a side view of FIG. 2.

The presently-preferred embodiment of a valve 10 according to the invention is shown in the FIGS. Valve body 11 is comprised of two parts: first part 12 and second part 13. Both are readily manufactured by simple and affordable injection molding processes in which cores are pulled axially, or by machining processes which generate the shape of the respective core. The two parts are easily assembled to form the body.

First part 12 has a neck 15 with an actuator passage 16 extending down first axis 17. The wall 18 of passage 16 extends across flow axis 19 and merges into a bottom 20 which is curved at 21 and semi-cylindrical at 22.

An external thread on the neck provides attachment means 25 to receive a closure 26, which closure also supports at least part of a valve actuator 30 Valve actuator 30 is schematically shown as an axially movable rod 31 supporting a valving element 32, for example a plug seatable on the valve seat to control flow through the valve. Suitable seals (not shown) will of course be provided.

The first part of the valve body also includes an exit port 34 centered on the flow axis. It may be formed in an exit tube 35 for attachment to external conduitry.

An assembly port 36 is also centered on the flow axis. It includes a cylindrical wall 37, and for purposes of disclosure that part of the valve chamber aligned with the actuator passage It further includes a shoulder 38 normal to the flow axis.

When the first valve part is to be made by a molding process it can be made with two or three cores as preferred. Best practice is to provide a first core that forms the actuator passage, a second core that forms the exit port, and a third core that forms the assembly port, and the bottom of the valving chamber beneath the actuator passage. If desired, the second and third cores could be combined and removed with a single pull. The cores abut one another during the molding process. The ends of the cores are abutted to create the shapes described.

When molded, the second part can be made with only two cores. This part includes an inlet port 40, an outlet port 41, a valve seat 42, and an indexing flange 43. The inlet port is cylindrical, and extends along the flow axis. The valve seat surrounds the outlet port. It lies in a plane parallel to the flow axis and normal to the actuator axis. The second part can be prepared with a first core that forms the valve seat, the outlet port, and a portion of the inlet port beneath the outlet port A second core forms the inlet port up to its intersection with the portions formed by the first core.

The identical parts can be made by machining processes, such as by drilling and the use of ball-end milling cutters. These tools produce an identical part. It will be noted that the actuator passage and the assembly port can be produced by an axially-thrust ball-ended end mill, the penetration of the milling cutter being such that at their farthest insertion (at different times, of course), their centers would coincide.

When machined, the valve seat would be formed as the boundary of a side-tapped hole in a generally tubular part.

Assembly of the body is straightforward. The second part is suitably aligned and pressed into the first part. They are sealed together as shown. Correct positioning of the valve seat is assured by the indexing flange, which is suitably located and indexed and brought against shoulder 38.

Figure 2:
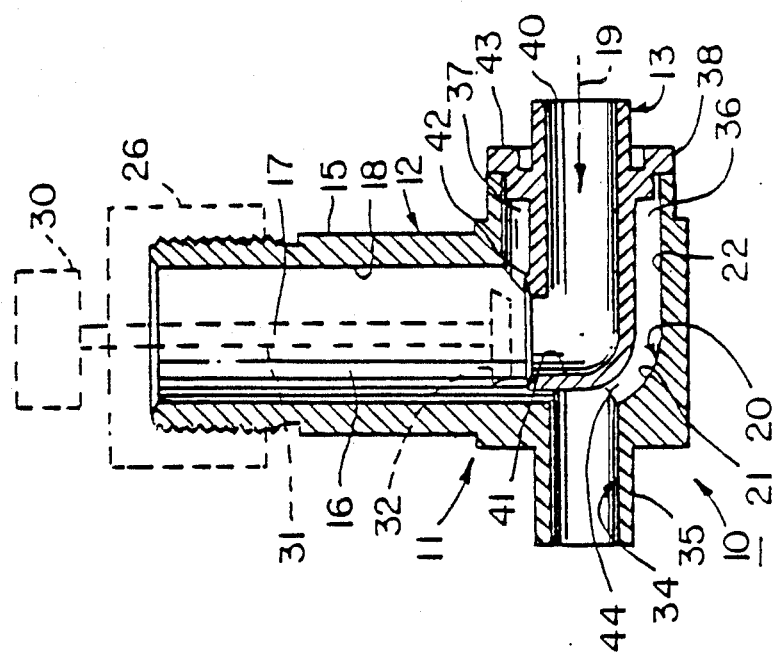
FIG. 2 is a cross-section taken at line 2—2 in FIG. 1.

It will be seen from FIG. 2 that the inactive regions in the valve body between the two parts forming the valving chamber 44 can be greatly minimized such as by reducing the open region between the valve actuator and the wall of the actuator passage. The actuator means has been shown schematically. It could be a linear actuator such as a solenoid, or a threaded device as appropriate. This invention permits a wide selection of such means.

What is important to this invention is the reduced volume flow chamber 44. An objective of this invention is to minimize excess (dead) volume in this valve. To do so, the cross-section to be encountered anywhere by a flowing stream ought not to appreciately exceed the cross-section of its intake or exit port.

In this construction, fluid rises above the valve seat and flows down and around the second part. A clearance 45 between the tip of the second part and the valve seat and the entrance to the exit port closely matches the area of the valve seat and the exit port. Thus there is sufficient cross-section area to accommodate the flow, but there is no excess volume in the valving chamber. The size of the second part reduces what would have been dead volume.

Because the parts are directly assembled, they can be joined by simple welding, fusion, or cementing processes, which importantly reduces the envelope size and complexity of structure. Threaded joinders can be used but will be avoided when possible. The valve can be made of stainless steel, for example. In this event machining process will be preferred. When made of plastic, or powdered metal, molding will be preferred.

This invention is not to be limited by the embodiment shown in the drawings and described in the description, which is given by way of example and not of limitation, but only in accordance with the scope of the appended claims.

I claim:

1. A valve for controlling the flow of fluid, comprising:
   a valve body consisting of a first part and a second part;
   said first part consisting of a seamless unitary body including an internal valve which forms an internal actuator passage, said actuator passage extending along an actuator axis, a cylindrical assembly port extending along a flow axis, and an exit port extending parallel to said flow axis opposite to said assembly port, said flow axis being normal to said actuator axis, said passages intersecting one another, and a peripheral shoulder lying in a plane normal to said flow axis facing away from said exit port;
   said second part consisting of a seamless unitary body having a mounting end and a free end, an internal flow passage, an inlet port to said flow passage, and an outlet from said flow passage, said flow passage extending parallel to said flow axis when said body parts are assembled to one another, and a peripheral valve seat aligned with said flow passage and lying in a plane normal to said actuator axis, the free end of said second part being spaced from said exit port and also spaced from said internal wall of said first part whereby to form a flow chamber from the valve seat to said exit port, and a peripheral flange around said second part adjacent to the mounting end of said second part so disposed and arranged as to contact said shoulder on the first part to index their relative mounted locations, said parts being joined at said shoulder and flange, comprising the only joinder of said two parts, said free end of said second part thereby being cantilevered to freely project into said first part without other contact with it;
   closure means closing said actuator passage; and
   valve actuator means in said actuator passage controllably adapted to open or to close the valve to flow past said valve seat.

2. A valve according to claim 1 in which the end of the second part inside the first part is rounded, and in which the adjacent parts of the wall of the first part in the flow chamber are similarly rounded.

3. A valve according to claim 1 in which said parts are formed by molding, with the inside walls formed by cores pulled along their axes.

4. A valve according to claim 1 in which the internal portions of said parts are formed by cutting processes exerted around a tool axis coincident with respective axes of the part.

* * * * *